3,748,322
4-AZA-5-CARBAMOYLOXIMIDO-TRICYCLO-
[4.3.1.1³,⁸]UNDECANES
Kyu Tai Lee, Wilmington, Del., assignor to E. I. du Pont
de Nemours and Company, Wilmington, Del.
No Drawing. Filed June 11, 1971, Ser. No. 152,407
Int. Cl. C07d 41/04
U.S. Cl. 260—239 BF                            4 Claims

ABSTRACT OF THE DISCLOSURE

This invention relates to a class of 4-aza-5-carbamoyloximidotricyclo[4.3.1.1$^{3,8}$]undecanes that exhibit antihypertensive activity in warm-blooded animals. A typical compound is 4 - aza-5-(N-methyl)carbamoyloximidotricyclo [4.3.1.1$^{3,8}$]undecane.

BACKGROUND OF THE INVENTION

Copending application Ser. No. 884,737 filed Dec. 12, 1969, now abandoned, assigned to my assignee, discloses aliphatic amidoxime O-carbamates useful as antihypertensive agents. Application Ser. No. 135,616, filed Apr. 20, 1971, now abandoned, also assigned to my assignee, discloses aryl acetamidoxime O-carbamates as antihypertensive agents.

The 4 - aza - 5-carbamoyloximidotricyclo[4.3.1.1$^{3,8}$]undecanes of the present invention differ materially in structure from the compounds of these earlier applications as may be noted by the fact that the amido nitrogen of the compounds of the invention is a part of a tricyclic ring system.

SUMMARY OF THE INVENTION

This invention relates to 4-aza-5-carbamoyloximidotricyclo[4.3.1.1$^{3,6}$]undecanes of the formula

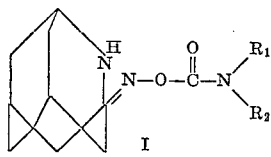

wherein $R_1$ and $R_2$ are each H or $CH_3$; and the pharmaceutically acceptable salts of said compounds. Illustrative of such salts are the hydrochlorides, hydrobromides, sulfates, phosphates and nitrates.

Another embodiment of the invention relates to a method for treating hypertension in warm-blooded animals which comprises administering to said animal an antihypertensive amount of a compound of the invention.

Still another embodiment of the invention relates to pharmaceutical compositions which contain a compound of the invention in combination with suitable pharmaceutical adjuvants and modifiers.

DETAILED DESCRIPTION OF THE INVENTION

The compounds of the invention can be prepared conveniently by using 4-aza-5-oximidotricyclo[4.3.1.1$^{3,8}$] undecane (J. G. Korsloot et al., Tetrahedron Letters, 2059 (1970)) as a starting material.

The compound of Formula I wherein $R_1=R_2=H$ can be prepared by adding a suitable acid such as trifluoroacetic acid or hydrochloric acid to a mixture of 4-aza-5-oximidotricyclo[4.3.1.1$^{3,8}$]undecane and an alkali metal cyanate in an inert organic solvent such as methylene chloride or benzene maintained at ambient or slightly elevated temperatures.

The compound of Formula I wherein $R_1$ or $R_2=CH_3$ can be prepared by reacting 4-aza-5-oximidotricyclo [4.3.1.1$^{3,8}$]undecane with methyl isocyanate. This is readily effected by stirring the former in a suitable solvent such as dioxane, tetrahydrofuran, ethyl acetate, chloroform, diethyl ether, benzene, or the like, preferably containing a catalytic amount of triethylenediamine, while adding the latter at a rate to maintain ambient or slightly elevated temperatures. The reaction is complete after a few hours but longer reaction times such as an overnight period will cause no harm.

The compound of Formula I wherein $R_1=R_2=CH_3$ can be prepared by reacting 4-aza-5-oximidotricyclo [4.3.1.1$^{3,8}$]undecane with N,N-dimethylcarbamoyl halide. This is readily effected by adding the latter to the former in a suitable inert organic solvent such as referred to above preferably containing an equivalent amount of triethylenediamine. Again, the reaction is complete after a few hours but longer periods of reaction will cause no harm.

The salts of the above free compounds can be prepared by treating a solution of the compound with the acid of the salt desired. The solvent can be selected to provide a system in which the salt formed is insoluble and therefore easily separated from the solution. Alternatively, a solvent system in which the end product salt is soluble can be employed and the solvent can be removed by evaporation.

The preparation of the compounds of this invention is illustrated but not limited by the following examples.

EXAMPLE 1

4-aza-5-carbamoyloximidotricyclo[4.3.1.1$^{3,8}$]undecane

To a mixture of 1.8 g. (0.01 mole) of 4-aza-5-oximidotricyclo[4.3.1.1$^{3,8}$]undecane [Tetrahedron Letters, 2059 (1970)] and 1.3 g. (0.02 mole) of sodium cyanate in 25 ml. of methylene chloride is added slowly 1.55 ml. (0.021 mole) of trifluoroacetic acid at room temperature. The resulting mixture is stirred at room temperature for 4 hours, and washed with 10 ml. of ice water. The methylene chloride solution is dried over anhydrous magnesium sulfate, filtered, and concentrated to give a product, which is recrystallized from methylene chloride-methylcyclohexase mixture.

EXAMPLE 2

4-aza-5-(N-methyl)carbamoyloximidotricyclo
[4.3.1.1$^{3,8}$]undecane

To a solution of 1.65 g. (9.16 mmole) of 4-aza-5-oximidotricyclo[4.3.1.1$^{3,8}$]undecane and a catalytic amount of triethylenediamine dissolved in 25 ml. of dry methylene chloride was added 0.6 g. (10 mmole) of methyl isocyanate. The resulting solution was stirred at room temperature for 15 hours and concentrated under reduced pressure. The solid residue was recrystallized from methylene chloride-methylcyclohexane mixture to give 1.6 g. (74% yield) of the pure product: M.P. 133.5–135° C.

Analysis.—Calcd. for $C_{12}H_{19}N_3O_2$ (percent): C, 60.73; H, 8.07; N, 17.71. Found (percent): C, 60.48; H, 8.03; N, 17.34.

EXAMPLE 3

4-aza-5-(N,N-dimethyl)carbamoyloximidotricyclo
[4.3.1.1$^{3,8}$]undecane

To a solution of 1.8 g. (0.01 mole) of 4-aza-5-oximidotricyclo[4.3.1.1$^{3,8}$]undecane and 1.12 g. (0.01 mole) of triethylenediamine in 50 ml. of dry methylene chloride is added 1.08 g. (0.01 mole) of N,N-dimethylcarbamoyl chloride. The resulting mixture is stirred at room temperature for 15 hours, then washed with 25 ml. of ice water, dried over anhydrous magnesium sulfate, and concentrated. The solid residue is recrystallized from methylene chloride-methylcyclohexane.

The compounds of this invention can be administered in the treatment of hypertension according to the invention by any means that effects contact of the active ingredient compound with the site of action in the body of a warm-blooded animal. For example, administration can be parenterally, i.e., subcutaneously, intravenously, intramuscularly, or intraperitoneally. Alternativey or concurrently, administration can be by the oral route.

The dosage administered will be dependent upon the age, health and weight of the recipient, the extent of disease, kind of concurrent treatment, if any, frequency of treatment and the nature of the effect desired. Generally, a daily dosage of active ingredient compound will be from about 0.01 to 50 milligrams per kilogram of body weight. Ordinarily, from 0.05 to 40 and preferably 0.1 to 20 milligrams per kilogram per day in one or more applications per day is effective to obtain desired results.

The antihypertensive activity of the compounds of the invention is evidenced by tests conducted in hypertensive rats and by further tests which show a blood pressure lowering action in normotensive dogs.

In a test involving rats, made hypertensive by repeated injections of desoxycorticosterone acetate (DOCA) according to the method described by Stanton and White [Arch. Intern. Pharmacodyn, 154, 351 (1965)], 4-aza-5-(N - methyl)carbamoyloximidotricyclo[4.3.1.1$^{3,8}$]undecane is administered orally to groups of 8 rats, each group receiving a different dose level. The compound is prepared in an aqueous polyvinyl alcohol acacia vehicle and administered at a volume to body weight ratio of 5.0 ml./kg.

Systolic blood pressure is measured at one-, two-, four-, and six-hour intervals after oral dosing by a modification of the microphone-manometer technique [Friedman, M. and Freed, S.C., Proc. Soc. Exp. Biol. and Med. 70, 670 (1949)].

It is determined as a result of the test that 8.7 mg. per kg. of the compound produces a 30 mm. mercury (mm. Hg) reduction in blood pressure when compared with the blood pressure of concurrently tested control animals which received only the polyvinyl alcohol acacia vehicle.

In a test involving dogs, 4-aza-5-(N-methyl)carbamoyloximidotricyclo[4.3.1.1$^{3,8}$]undecane is administered intravenously (i.v.) to four anesthetized normotensive dogs according to a cumulative dose schedule. Arterial blood pressure is recorded directly through an arterial cannula and a polygraph by which it is determined that the compound shows statistically significant blood pressure lowering in comparison to control animals.

The compounds of this invention can be employed in useful pharmaceutical compositions according to the present invention in such dosage forms as tablets, capsules, powder packets or liquid solutions, suspensions or elixirs for oral administration or liquid for parenteral use, and in certain cases, suspensions for parenteral use (except intravenous injections). In such compositions, the active ingredient will ordinarily always be present in an amount of at least 0.5% by weight based on the total weight of the composition and not more than 90% by weight.

Besides the active ingredient compound of this invention, the antihypertensive composition will contain a solid or liquid non-toxic pharmaceutical carrier for the active ingredient.

In one embodiment of a pharmaceutical composition of this invention, the solid carrier is a capsule which can be of the ordinary gelatin type. In the capsules will be from about 5 to 90% by weight of a compound of the invention and 95 to 10% of a carrier. In another embodiment, the active ingredient is tableted with or without adjuvants. In yet another embodiment, the active ingredient is put into powder packets and employed. These capsules, tablets and powders will generally constitute from about 1% to about 95% and preferably from 5% to 90% by weight of active ingredient. These dosage forms preferably contain from about 5 to about 500 milligrams of active ingredient, with about 7 to about 250 most preferred.

The pharmaceutical carrier can, as previously indicated, be a sterile liquid such as water and oil, including those of petroleum, animal, vegetable oils of synthetic origin, for example peanut oil, soybean oil, mineral oil, sesame oil and the like. In general, water saline, aqueous dextrose (glucose) and related sugar solutions and glycols such as propylene glycol or polyethylene glycols are preferred liquid carriers, particularly for injectible solutions. Sterile injectible solutions such as saline will ordinarily contain from about 0.5% to 25% and preferably about 1 to 10% by weight of the active ingredient.

As mentioned above, oral administration can be in a suitable suspension or syrup, in which the active ingredient ordinarily will constitute from about 0.7 to 10% and preferably about 1 to 5% by weight. The pharmaceutical carrier in such composition can be a watery vehicle such as an aromatic water, a syrup or a pharmaceutical mucilage.

Suitable pharmaceutical carriers are described in "Remington's Pharmaceutical Sciences," by E. W. Martin, a well-known reference text in this field.

The following examples will further illustrate the preparation of pharmaceutical compositions of the invention.

EXAMPLE 4

A large number of unit capsules are prepared by filling standard two-piece hard gelatin capsules each with 250 milligrams of powdered 4-aza-5-(N-methyl)carbamoyloximidotricyclo[4.3.1.1$^{3,8}$]undecane, 110 milligrams of lactose, 32 milligrams of talc and 8 milligrams of magnesium stearate.

EXAMPLE 5

A mixture of 4 - aza - 5-carbamoyloximidotricyclo-[4.3.1.1$^{3,8}$]undecane in soybean oil is prepared and injected by means of a positive displacement pump into gelatin to form soft gelatin capsules containing 35 milligrams of the active ingredient. The capsules are washed in petroleum ether and dried.

EXAMPLE 6

A large number of tablets are prepared by conventional procedures so that the dosage unit is 100 milligrams of active ingredient, 7 milligrams of ethyl cellulose, 0.2 milligram of colloidal silicon dioxide, 7 milligrams of magnesium stearate, 11 milligrams of microcrystalline cellulose, 11 milligrams of cornstarch and 98.8 milligrams of lactose. Appropriate coatings may be applied to increase palatability or delay absorption.

EXAMPLE 7

A parenteral composition suitable for administration by injection is prepared by stirring 1.5% by weight of 4 - aza - 5 - (N,N - dimethyl)carbamoyloximidotricyclo-[4.3.1.1$^{3,8}$] undecane in 10% by volume propylene glycol and water. The solution is sterilized by filtration.

EXAMPLE 8

An aqueous suspension is prepared for oral administration so that each 5 milliliters contain 50 milligrams of finely divided 4-aza-5-(N-methyl)carbamoyloximidotricyclo[4.3.1.1$^{3,8}$]undecane, 500 milligrams of acacia, 5 milligrams of sodium benzoate, 1.0 gram of sorbitol solution, U.S.P., 5 milligrams of sodium saccharin and 0.025 milliliter of vanilla tincture.

EXAMPLE 9

A parenteral composition suitable for administration by injection is prepared by dissolving 1% by weight of 4 - aza - 5 - (N,N - dimethyl)carbamoyloximidotricyclo [4.3.1.1$^{3,8}$]undecane in sodium chloride injection U.S.P.

XV and adjusting the pH of the solution to between 6 and 7. The solution is sterilized by filtration.

I claim:
1. A compound selected from
(a) compounds of the formula

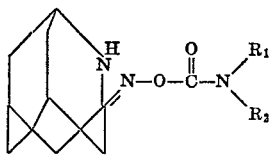

where $R_1$ and $R_2$ are each hydrogen or methyl; and
(b) pharmaceutically acceptable salts of the compounds of (a).

2. The compound of claim 1 which is 4-aza-5-carbamoyloximidotricyclo[4.3.1.1$^{3,8}$]undecane.

3. The compound of claim 1 which is 4-aza-5-(N-methyl)carbamoyloximidotricyclo[4.3.1.1$^{3,8}$]undecane.

4. The compound of claim 1 which is 4-aza-5-(N,N-dimethyl)carbamoyloximidotricyclo[4.3.1.1$^{3,8}$]undecane.

References Cited
Keizer et al.: Tetrahedron Letters, No. 24, pp. 2059–2060 (1970).

ALTON D. ROLLINS, Primary Examiner

U.S. Cl. X.R.
424—244

UNITED STATES PATENT OFFICE
CERTIFICATE OF CORRECTION

Patent No. 3,748,322      Dated July 24, 1973

Inventor(s) Kyu Tai Lee

It is certified that error appears in the above-identified patent and that said Letters Patent are hereby corrected as shown below:

The formula at column 1, line 40 and in claim 1 (at column 5, line 9) reading

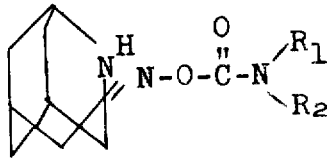

should read

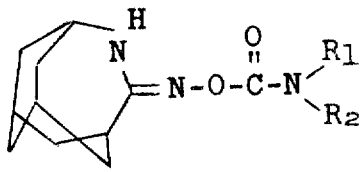

Signed and sealed this 29th day of October 1974.

(SEAL)
Attest:

McCOY M. GIBSON JR.
Attesting Officer

C. MARSHALL DANN
Commissioner of Patents